No. 628,088. Patented July 4, 1899.
C. T. GILES.
FILTER.
(Application filed Feb. 14, 1898.)
(No Model.)
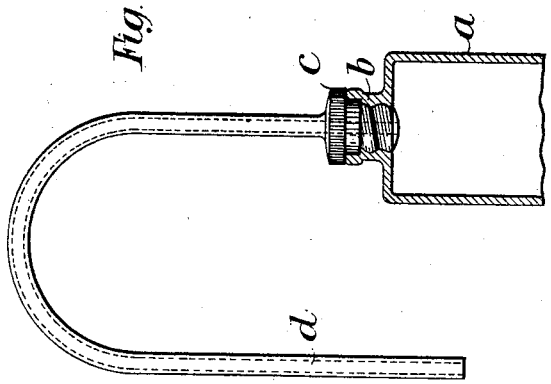
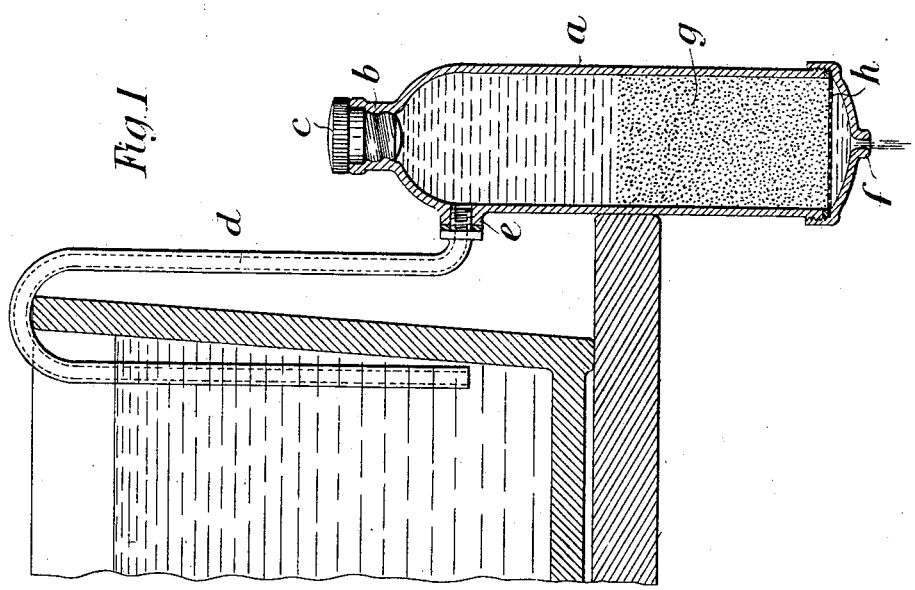
Witnesses
J. D. Kingsbury
G. A. Vanbenschoten
Inventor
Charles T. Giles
By Whitaker Prevost
Attys.

UNITED STATES PATENT OFFICE.

CHARLES TYRRELL GILES, OF LONDON, ENGLAND.

FILTER.

SPECIFICATION forming part of Letters Patent No. 628,088, dated July 4, 1899.

Application filed February 14, 1898. Serial No. 670,257. (No model.)

*To all whom it may concern:*

Be it known that I, CHARLES TYRRELL GILES, M. P., a subject of the Queen of Great Britain, residing at London, England, have invented a new and useful Filter, (for which I have applied for a patent in Great Britain, No. 17,008, dated July 19, 1897,) of which the following is a specification.

My invention has for its object to provide a filter which occupies little space, whereby it is rendered portable, which will be supplied automatically from an ordinary vessel, whereby the constant refilling of the same is unnecessary, and which can be readily purified; and to these ends my invention consists in the combination of the filtering vessel with a siphon, as hereinafter described.

In the accompanying drawings, Figure 1 is a sectional elevation showing my improved filter as in use, and Fig. 2 is a sectional view illustrating a modification.

$a$ is the filtering vessel, which is made of any suitable material, but preferably of a material, such as earthenware or metal, which will not be injured by being subjected to heat for purifying it—such as, say, the temperature of boiling water. This vessel $a$ is provided at the top with an aperture $b$, adapted to be hermetically closed—for instance, by means of a screw-stopper $c$.

$d$ is the siphon, which is attached to the vessel $a$ by any convenient means and which is also advantageously made of metal, so that it will not readily break and so that heat may be applied for cleansing it. This siphon may be attached to the vessel in any suitable manner. As shown in Fig. 1, it is represented as being fixed to a nozzle $e$ upon the side of the filtering-chamber, while in Fig. 2 it is represented as being attached to the stopper $c$, which closes the filtering vessel. At the bottom of the said filtering vessel is a hole $f$ for the escape of the filtered water.

$g$ indicates the filtering medium, such as powdered charcoal, and $h$ is a perforated plate upon which the said material rests and which will prevent the said filtering material from clogging up the discharge-aperture $f$. To permit of introducing this perforated plate $h$ into the filtering vessel, the upper end or the lower end of the latter is made removable. As shown in Fig. 1 of the drawings, the lower end of the vessel is represented as being detachably connected to the sides of the same by screw-threads.

It will be obvious that instead of using a stopper which enters the aperture at the top of the filtering vessel I may use a stopper which engages with the outside of the said vessel, or any other suitable form of stopper may be used.

With the construction hereinbefore described it will be noticed that the filtering vessel practically forms an enlargement upon the long leg of the siphon, so that when the filter is placed with the short leg of the siphon in a vessel filled with water and started the flow of water through the filtering material will be maintained without the necessity for constantly filling the filtering vessel, the filter continuing to work as long as the supply of water in the reservoir is maintained.

To start the filter, the stopper $c$ is removed and the filtering-chamber is wholly or partially filled with liquid. The stopper being then replaced the flow of water through the siphon $d$ will commence. The presence of a small quantity of air in the filtering vessel will not be detrimental; but in practice the discharge-aperture $f$ should not be greater than that of the cross-sectional area of the siphon-tube $d$, so that the water cannot flow out of the filtering-chamber faster than it enters through the siphon.

It will be understood that for transport the siphon-tube $d$ may be detached from the filtering vessel $a$, and when it is required to purify the apparatus it will only be necessary to put the same into boiling water.

By making the siphon-tube of metal it will be seen that it can be placed over the edge of a tub, bucket, or other receptacle and will support the filter in operative position, as shown in Fig. 1 of the drawings. Moreover, the siphon is attached to the upper part of the filter-casing and the discharge-aperture is in the lower part of the casing, so that the flow of the liquid through the filter is in the same direction that it follows in passing through the siphon.

Having now particularly described and ascertained the nature of my said invention and in what manner the same is to be performed, I declare that what I claim is—

In a portable filter, the combination of a siphon, a chamber or vessel introduced into the long leg of the said siphon and containing the filtering medium and an aperture in the said chamber closed by a stopper and serving for allowing the introduction of water into the said chamber above the filtering medium for starting the siphon, substantially as described.

CHARLES TYRRELL GILES.

Witnesses:
G. W. RICKETTS,
H. E. WILLIAMS.